United States Patent
Casper et al.

(10) Patent No.: US 10,448,579 B2
(45) Date of Patent: Oct. 22, 2019

(54) LIGHTING DEVICE CAPABLE OF PROVIDING HORTICULTURE LIGHT AND METHOD OF ILLUMINATING HORTICULTURE

(71) Applicant: SIGNIFY HOLDING B.V., Eindhoven (NL)

(72) Inventors: Lars Christian Casper, Eindhoven (NL); Cristina Tanase, Eindhoven (NL); Rifat Ata Mustafa Hikmet, Eindhoven (NL); Celine Catherine Sarah Nicole, Eindhoven (NL); Esther Maria Van Echtelt, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 14/413,767

(22) PCT Filed: Jul. 8, 2013

(86) PCT No.: PCT/IB2013/055569
§ 371 (c)(1),
(2) Date: Jan. 9, 2015

(87) PCT Pub. No.: WO2014/009865
PCT Pub. Date: Jan. 16, 2014

(65) Prior Publication Data
US 2015/0128488 A1    May 14, 2015

Related U.S. Application Data

(60) Provisional application No. 61/670,173, filed on Jul. 11, 2012.

(51) Int. Cl.
*A01G 7/04* (2006.01)
*F21V 9/08* (2018.01)
(Continued)

(52) U.S. Cl.
CPC .............. *A01G 7/045* (2013.01); *F21V 9/08* (2013.01); *F21V 9/30* (2018.02); *F21Y 2115/10* (2016.08); *Y02P 60/149* (2015.11)

(58) Field of Classification Search
CPC ..................................................... A01G 7/045
(Continued)

(56) References Cited

U.S. PATENT DOCUMENTS 4,368,725 A * 1/1983 McClintock .................. 126/595
5,269,093 A * 12/1993 Horaguchi et al. ........ 47/58.1 R
(Continued)

FOREIGN PATENT DOCUMENTS

AU    2010297160 A1 *  2/2012    ............. A01G 7/045
CN       1692700 A  * 11/2005    ............. A01G 7/045
(Continued)

*Primary Examiner* — Magdalena Topolski
*Assistant Examiner* — Morgan T Barlow
(74) *Attorney, Agent, or Firm* — Daniel J. Piotrowski

(57) ABSTRACT

The invention provides a lighting device (100) with light emitting diodes (10) configured to generate light (11) having a wavelength selected from the range of 400-475 nm, wherein the lighting device (100) comprises at least two light emitting parts (100a, 100b). The first light emitting part (100a) comprises a first subset (10a) of light emitting diodes (10), and is configured to provide a first light (111a) having the first spectral light distribution substantially in the range of 400-475 nm. The second light emitting part (100b) comprises a second subset (10b) of light emitting diodes (10) and comprising a light conversion element (20) configured to convert at least part of the light (11) generated from the second subset (10b) of the plurality of light emitting diodes (10) into the second light (111b), with the second spectral light distribution substantially in the range of 625-800 nm. The first subset (10a) of the plurality of light emitting diodes (10) and the second subset (10b) of the
(Continued)

plurality of light emitting diodes (10) are independently controllable.

15 Claims, 7 Drawing Sheets

(51) Int. Cl.
*F21V 9/30* (2018.01)
*F21Y 115/10* (2016.01)

(58) Field of Classification Search
USPC .................. 47/58.1 LS, 17, 58.1 R; 362/231
See application file for complete search history.

(56) References Cited

U.S. PATENT DOCUMENTS

| | | | |
|---|---|---|---|
| 6,509,188 B1* | 1/2003 | Trosch | C12M 21/02 435/292.1 |
| 7,038,370 B2* | 5/2006 | Mueller-Mach | C09K 11/7774 252/301.4 R |
| 7,220,018 B2* | 5/2007 | Crabb | A01G 7/045 362/231 |
| 7,441,915 B2* | 10/2008 | Shouse | A01G 9/24 362/101 |
| 7,472,513 B2* | 1/2009 | Bula | 47/89 |
| 7,843,639 B2* | 11/2010 | Oyama | 359/591 |
| 8,549,787 B2* | 10/2013 | Aikala | A01G 7/045 47/58.1 LS |
| 8,847,514 B1* | 9/2014 | Reynoso | A01G 7/045 315/307 |
| 8,850,743 B2* | 10/2014 | Aikala | A01G 7/045 47/58.1 LS |
| 9,688,951 B2* | 6/2017 | Krenbrink | C12M 23/18 |
| 10,080,357 B2* | 9/2018 | Uchida | A01M 1/04 |
| 2003/0073231 A1* | 4/2003 | Dutil | C12M 21/02 435/292.1 |
| 2005/0135104 A1* | 6/2005 | Crabb | A01G 7/045 362/276 |
| 2006/0032115 A1* | 2/2006 | Van Den Dool | 47/17 |
| 2006/0033083 A1* | 2/2006 | Sakane | C09K 11/0883 252/301.4 F |
| 2007/0184274 A1* | 8/2007 | Wheatley et al. | 428/411.1 |
| 2008/0036362 A1* | 2/2008 | Tanimoto | H01L 33/486 313/498 |
| 2008/0290319 A1 | 11/2008 | Naum | |
| 2008/0302004 A1* | 12/2008 | Lin | 47/58.1 LS |
| 2009/0040745 A1* | 2/2009 | Nemchuk | 362/84 |
| 2009/0158647 A1* | 6/2009 | Kleinwaechter | 47/17 |
| 2009/0288340 A1* | 11/2009 | Hess | A01G 9/26 47/58.1 LS |
| 2010/0031562 A1 | 2/2010 | Browne | |
| 2010/0244724 A1* | 9/2010 | Jacobs | H05B 33/0803 315/253 |
| 2010/0255541 A1* | 10/2010 | Hu | A01G 33/00 435/71.1 |
| 2010/0281771 A1* | 11/2010 | Kudo | A01G 7/045 47/58.1 LS |
| 2010/0289411 A1* | 11/2010 | Smits et al. | 315/113 |
| 2011/0016779 A1* | 1/2011 | Hermans | A01G 9/1438 47/17 |
| 2011/0026241 A1 | 2/2011 | Kim | |
| 2011/0047867 A1* | 3/2011 | Holland | G01J 3/10 47/1.5 |
| 2011/0068322 A1* | 3/2011 | Pickett | C09K 11/02 257/13 |
| 2011/0085352 A1* | 4/2011 | Ito | H01L 33/50 362/617 |
| 2011/0115385 A1* | 5/2011 | Waumans et al. | 315/152 |
| 2011/0138688 A1* | 6/2011 | Kim et al. | 47/17 |
| 2011/0197503 A1* | 8/2011 | Usami | A01G 7/045 47/58.1 LS |
| 2011/0209400 A1* | 9/2011 | Rooymans | 47/17 |
| 2011/0228515 A1* | 9/2011 | Grajcar | A01K 1/00 362/84 |
| 2011/0234120 A1* | 9/2011 | Lin | A01G 7/045 315/294 |
| 2011/0302839 A1* | 12/2011 | Senders et al. | 47/66.6 |
| 2012/0000121 A1* | 1/2012 | Swann | A01G 9/14 47/17 |
| 2012/0033403 A1* | 2/2012 | Lamvik | F21V 7/0008 362/84 |
| 2012/0068615 A1* | 3/2012 | Duong | A01G 7/045 315/192 |
| 2012/0104977 A1 | 5/2012 | McKenzie | |
| 2012/0124903 A1* | 5/2012 | Takeuchi | A01G 7/045 47/58.1 LS |
| 2012/0159845 A1* | 6/2012 | Alkala | A01G 7/045 47/58.1 LS |
| 2012/0170264 A1* | 7/2012 | McKenzie et al. | 362/231 |
| 2013/0021797 A1* | 1/2013 | Kubo | A01G 7/045 362/235 |
| 2013/0042523 A1* | 2/2013 | Lee et al. | 47/17 |
| 2013/0187180 A1* | 7/2013 | Chen | A01G 7/045 257/98 |
| 2013/0255150 A1* | 10/2013 | Karpinski | A01G 7/045 47/58.1 LS |
| 2013/0264934 A1* | 10/2013 | Osaki | A01G 7/045 313/46 |
| 2013/0292717 A1* | 11/2013 | Seibel, II | A01G 7/045 257/89 |
| 2013/0318869 A1* | 12/2013 | Aikala | A01G 7/045 47/58.1 LS |
| 2014/0340890 A1 | 11/2014 | Hata | |

FOREIGN PATENT DOCUMENTS

| | | |
|---|---|---|
| CN | 1692700 A | 11/2005 |
| CN | 102088840 A | 6/2011 |
| JP | 2008235680 A | 10/2008 |
| NL | 1035261 C1 | 10/2009 |
| WO | 2009052329 A1 | 4/2009 |
| WO | WO-2013027198 A1 * | 2/2013 ............ A01G 7/045 |

* cited by examiner

LIGHTING DEVICE CAPABLE OF PROVIDING HORTICULTURE LIGHT AND METHOD OF ILLUMINATING HORTICULTURE

CROSS-REFERENCE TO PRIOR APPLICATIONS

This application is the U.S. National Phase application under 35 U.S.C. § 371 of International Application No. PCT/IB2013/055569, filed on Jul 8, 2013, which claims the benefit of U.S. Provisional Patent Application No. 61/670,173, filed on Jul 11, 2012. These applications are hereby incorporated by reference herein.

FIELD OF THE INVENTION

The invention relates to a lighting device capable of providing horticulture light, as well as to a method for providing horticulture light to a (horticulture) crop.

BACKGROUND OF THE INVENTION

Horticulture lighting is known in the art. US2010031562, for instance, describes a lighting installation for use in greenhouse farming for lighting crops in a greenhouse, comprising a number of light sources, such as lamps, provided above the crops to be lighted, and a number of dimmer devices for the light sources, characterized in that the dimmer devices are provided with control means for periodically, automatically varying the light intensity of the light sources cooperating with the dimmer devices according to a predetermined pattern. US2010031562 aims to provide a method and lighting installation, respectively, for greenhouse farming. In particular, the light sources are divided into a number of groups, the lighting installation being designed such that, in use, the power of each group varies according to a predetermined pattern, while patterns of different groups are phase-shifted relative to each other such that the electric power consumed by the joint groups varies less than the sum of the power variations of the separate groups, more particularly such that the electric power consumed by the joint groups varies less than the power variation of a single group, more particularly still such that the electric power consumed by the joint groups varies to a smallest possible extent, or does, at least virtually, not vary. In particular, all patterns are the same, but only phase-shifted relative to each other.

SUMMARY OF THE INVENTION

Plants use the process of photosynthesis to convert light, $CO_2$ and $H_2O$ into carbohydrates (sugars). These sugars are used to fuel metabolic processes. The excess of sugars is used for biomass formation. This biomass formation includes stem elongation, increase of leaf area, flowering, fruit formation, etc. The photoreceptor responsible for photosynthesis is chlorophyll. Apart from photosynthesis, also photoperiodism, phototropism and photomorphogenesis are representative processes related to interaction between radiation and plants:
- photoperiodism refers to the ability that plants have to sense and measure the periodicity of radiation (e.g. to induce flowering),
- phototropism refers to the growth movement of the plant towards and away from the radiation, and
- photomorphogenesis refers to the change in form in response to the quality and quantity of radiation.

Two important absorption peaks of chlorophyll a and b are located in the red and blue regions, especially from 625-675 nm and from 425-475 nm, respectively.

Additionally, there are also other localized peaks at near-UV (300-400 nm) and in the far-red region (700-800 nm). The main photosynthetic activity seems to take place within the wavelength range 400-700 nm. Radiation within this range is called photosynthetically active radiation (PAR).

Other photo sensitive processes in plants include phytochromes. Phytochrome activity steers different responses such as leaf expansion, neighbor perception, shade avoidance, stem elongation, seed germination and flowering induction. The phytochrome photo system includes two forms of phytochromes, Pr and Pfr, which have their sensitivity peaks in the red at 660 nm and in the far-red at 730 nm, respectively.

In horticulture, the photosynthetic photon flux density (PPFD) is measured in number of photons per second per unit of area (in $\mu mol/sec/m^2$; a mol corresponding to $6 \cdot 10^{23}$ photons). In practice, when applying e.g. inter-lighting (see below), especially for tomatoes, the red PPFD used may be 200 $\mu mol/sec/m^2$ and a ratio blue:red may be typically about 1:7 (with red and blue ranging from 625-675 nm respectively from 400-475 nm). Especially, the photosynthetic photon flux density may comprise about 10% blue and 90% red. The PPFD can be determined from a photodiode or measured directly with a photomultiplier.

Plant growth depends not only on the amount of light but also on spectral composition, duration, and timing of the light on the plant. A combination of parameter values in terms of these aspects is called "light recipe" for growing the plant.

LEDs can play a variety of roles in horticultural lighting such as:
1. Supplemental lighting: Lighting that supplements the natural daylight is used in order to increase production (of tomatoes for example) or extend crop production during e.g. the autumn, winter, and spring period when crop prices may be higher.
2. Photoperiodic lighting: The daily duration of light is important for many plants. The ratio of the light and dark period in a 24 hour cycle influences the blossoming response of many plants. Manipulating this ratio by means of supplemental lighting enables regulating the time of blossoming.
3. Cultivation without daylight in plant factories.
4. Tissue culture.

For providing supplemental lighting during autumn, winter and spring in green-houses (or all-year round in multi-layer growth), in general high-power gas-discharge lamps are used that have to be mounted at a relative high location above the plants to ensure sufficiently uniform light distribution across the plants. At present, in green houses different types of high power lamps ranging from 600 up to 1000 W (e.g. high power HID) are used to provide plants with supplemental light. One drawback is that from the location above the plants the amount of light reaching the lower parts of the plant is rather limited. At the same time the lower parts of the plant are often most in need of supplemental light. The same dilemma persists when using solid state lighting that is mounted above the plants. Nevertheless, LED lighting, especially solid state lighting, has some advantages over discharge based lighting.

Hence, it is an aspect of the invention to provide an alternative lighting device for horticulture application and/or an alternative lighting method for horticulture application, which preferably further at least partly obviate one or more of above-described drawbacks.

It is suggested to locate the lamps in between the plants. Especially when using LEDs this is a possibility since LEDs can be distributed such as to provide a rather uniform illumination in between the plants without causing burning of the leaves of the plants in contact with the LEDs. This method of supplemental lighting is called inter-lighting. However, as described below, LED lighting may in a specific embodiment also be used to non-uniformly illuminate crop or crop parts; for instance to address different parts of the crop, different spectral light distributions of the light may be desired.

To develop fruit weight, appearance, and physical strength, crops use various parts of the spectrum for various processes. In particular the photons in the blue and red region of the spectrum, with a wavelength especially between 440-470 nm respectively around 660 nm, are absorbed and used efficient by the plant for photosynthesis, but also other developmental processes. Consequently, to maximize the yield per amount of emitted photons, the spectral composition of the light source can be (but is not necessarily) limited to the specific spectral regions leading to the best result. Therefore, due to the narrow spectral emission range, LEDs are very suitable and very efficient for horticultural applications.

Zooming into the specific needs of the various plants, it becomes obvious that various plants can benefit from a unique spectral light composition. To give an example, some plants in some growth stages may require an amount of 5% blue light and 95% red light, while other plants and/or other growth stages may need 10% blue light and 90% red light for best growth and development (see also above). Furthermore, some plants may develop more efficiently when extending the spectrum to the far red, i.e. beyond 675 nm, such as in the range 675-800 nm, like about 750 nm. Consequently, every type of crop requires a specific spectral light distribution (and thus LED choice/combination), resulting in an enormous amount of different LED types and numbers. For suitable light sources for horticultural lighting it means that one needs either a broad product range to cover specific needs of the crop while at the same time being efficient in energy use, having a low product cost (not overdesigned), or one needs a product that is flexible and still affordable in terms of LED module production cost and plant grower cost of ownership.

Hence, in order to overcome one or more of the above problems, we propose a simple approach to manufacture LED modules dedicated to specific crop needs by using only blue LEDs in combination with one or more light conversion elements, especially based on organic phosphors, such as in covers, to provide the right colors. Basically embodiments of the invention comprise only one LED product with blue LEDs on which different light conversion elements, such as covers, are placed. An advantage of organic phosphor (covers) is the efficient conversion of blue light to red and deep red light, making the LED module more efficient than when using direct conversion. This concept may be applied in inter-lighting but also in other types of lighting, such as top lighting, including multi-layer lighting (see below). Hence, the invention is not limited to inter-lighting applications.

Hence, in a first aspect the invention a lighting device ("device") is provided capable of providing horticulture light having a spectral light distribution with at least light intensity at a first wavelength selected from the range of 400-475 nm and at a second wavelength selected from the range of 625-800 nm, especially at least 625-675 nm, the lighting device comprising a plurality of light emitting diodes (LEDs) configured to generate LED light having a wavelength selected from said range of 400-475 nm, especially 420-475 nm, wherein the plurality of light emitting diodes are configured in an array, wherein the lighting device comprises at least two light generating parts, wherein
- a first light generating part comprises a first subset of the plurality of light emitting diodes, wherein the first light generating part is configured to provide first light having a first spectral light distribution with at least light intensity at said first wavelength,
- a second light generating part comprises a second subset of the plurality of light emitting diodes wherein downstream the optical path of each LED of the second subset of the plurality of light emitting diodes a light conversion element is configured, the light conversion element configured to convert at least part of the LED light into converted light with the second wavelength, wherein the second light generating part is configured to provide second light comprising at least part of said converted light, and the second light having a second spectral light distribution with at least light intensity at said second wavelength,
- the spectral light distributions in the first wavelength range and the second wavelength range of the first light and the second light are different, and;
- the two or more subsets of the plurality of light emitting diodes are independently controllable.

In a further aspect, the invention provides a method of illuminating crop comprising illuminating at least part of the crop with horticulture light from the lighting device as defined herein.

An advantage of this (color tunable) device and this (color tunable) illumination method are that in a relative easy way, different types of crop, but also crop in different development stages, and even different parts of crop can be illuminated with light that fits best with the light demand of the type or crop, its stage and/or the respective crop part. However, also other options are advantageously possible. Especially, the device may allow and, the method may include, varying the spectral intensity distribution of the horticulture light as a function of one or more of (a) the addressed part of the crop, (b) the time of the day, (c) the light intensity and light distribution of other light than the horticulture light, (d) the type of crop, (e) the growth stage of the crop, (f) the stage of a fruit (of a crop), (g) the time to harvest, (h) the time from harvest, and (i) position in horticulture arrangement (comprising a plurality of crops). Hence, in fact a color tunable device and method are provided, that are suitable for horticulture lighting, and which may address at the appropriate time the appropriate photoreceptors at the appropriate crop part.

The phrase "capable of providing horticulture light having a spectral light distribution with at least light intensity at a first wavelength selected from the range of 400-475 nm and at a second wavelength selected from the range of 625-800 nm" does not imply that the light of the lighting device, when switched on, will always include intensity in both regions. Temporarily, the lighting device may provide light with intensity in only one of the spectral ranges, such as blue light or (far) red light. Further, due to the fact that the device comprises two light generating parts, it may well be that one part (mainly) gives blue light, and the other part may (mainly) give (far) red light. Further, the lighting device may also be configured to provide horticulture light having not only intensity in 400-475 nm and 625-800 nm, but also having intensity in other wavelength ranges. Further, in addition to horticulture light, i.e. light that is especially suitable for assisting the crop and/or its optional fruit in growing or maturing, etc., and especially configured to illuminate at least part of the crop directly, the lighting device may optionally also provide other types of light, such as especially suitable to assist a worker in a greenhouse.

In an embodiment the lighting device may comprise a plurality of light emitting diodes configured to generate light having the wavelength selected from the range of 400-475 nm, such as 420-475 nm, wherein the lighting device comprises at least two light generating parts, wherein the first light generating part comprises a first subset of the plurality of light emitting diodes, wherein the first light generating part is configured to provide a first light having the first spectral light distribution substantially in the range of 400-475 nm, such as 420-475 nm, the second light generating part comprises a second subset of the plurality of light emitting diodes and a light conversion element configured to convert at least part of the light generated from the second subset of the plurality of light emitting diodes into a second light with a second spectral light distribution substantially in the range of 625-800 nm, such as 625-675 nm, the second light generating part configured to provide the second light, wherein the first subset of the plurality of light emitting diodes and the second subset of the plurality of light emitting diodes are independently controllable.

The phrase "the spectral light distributions in the first wavelength range and the second wavelength range of the first light and the second light are different" may e.g. imply that the first light consists of light having intensity in said first wavelength range and that the second light consists of light having intensity in said second wavelength range. However, it may also imply that one or more of the first light and the second light also include light of other wavelengths, even in the second wavelength range and first wavelength range, respectively. As the two or more subsets of the plurality of light emitting diodes are independently controllable, the spectral light distribution of the light can nevertheless be tuned, as the spectral light distributions of the first light and the second light are different. In general however, the first light may essentially consist of light in said first wavelength range. On a photon count basis, the first light may comprise at least 90% of its intensity in the first wavelength range. On a photon count basis, the second light may comprise at least 50%, especially at least 70%, even more especially at least 90%, of its intensity in the second wavelength range. In general, on a photon count basis, the second light will comprise not more than 30%, especially not more than 15%, even more especially not more than 10%, such as at maximum 5%, of its intensity in the first wavelength range. For instance, the first light may essentially consist of light in the first wavelength range of 400-475 nm, whereas the second light may consist of some light in the first wavelength range, e.g. only 10% of the total photon intensity, and 90% of the intensity in the second wavelength range. As indicated above, this may include the situation that the first light consists of light having intensity in said first wavelength range and that the second light consists of light having intensity in said second wavelength range.

The lighting device may comprise a plurality of light emitting diodes which are especially configured in an array. This array is especially a 2D array (i.e. the LEDs are arranged in rows, adjacent to each other). The lighting device may span an area of for instance 0.5-400 m$^2$, such as 2-400 m$^2$. The number of LEDs per m$^2$ (LED density) may for instance be in the order of 1-400, such as 4-100, though there may be lighting devices with more or even with less LEDs (per square meter). Note that the distribution of the LEDs over the lighting device may be regular or may vary in different areas in the array. In general, the LEDs will be arranged in a regular pattern, though other patterns may not be excluded. The device comprises at least two LEDs; one LED functionally associated with the first light generating part and one LED functionally associated with the second light generating part. However, the device may comprise more than 2 LEDs, such as at least 4 LEDs, like at least 16 LEDs. The device may comprise n×m LEDs, wherein n is at least 4, and m is at least 4, such as at least 10. As indicated above, the plurality of LEDs comprises at least two subsets of (each at least 1) LEDs, which are used for the at least two light generating parts, respectively. The two or more subsets are independently controllable, such as by a control unit. In this way, the on-off status, and optionally the intensity, of the two or more subsets may individually be controlled. The LEDs may be arranged on a (conductive) wire grid.

In an embodiment, the first subset comprises a plurality of light emitting diodes. Alternatively or additionally, the second subset comprises a plurality of light emitting diodes. Especially, the first subset may comprise a plurality of light emitting diodes and the second subset may comprise a plurality of light emitting diodes. A light generating part may comprise one or more LEDs.

The LEDs are especially solid state LEDs, but may optionally also be organic LEDs. Also combinations of solid state and organic LEDs may be applied. The term "LED" may also relate to a plurality of LED dies. Hence, at a single LED position, a plurality of LED dies may be arranged, such as a LED package of 2 or more LED dies. The LEDs are especially designed to generate (LED) light in the first wavelength range.

The advent of solid state lighting based on LEDs offers opportunities for application in horticulture. The main advantages of using LEDs result from the possibility to control the spectral composition of the light to closely match the plant's photoreceptors' sensitivity. Together with additional benefits like improved heat control and freedom of distributing the LEDs, this provides a more optimal production and enables influencing the plant's morphology and composition. It also promises a reduced energy consumption (and associated cost).

Solid state LEDs are easily integrated into digital control systems, facilitating lighting programs such as "daily light integral" lighting and sunrise and sunset simulations. LEDs are safer to operate than current lamps because they do not have glass envelopes and do not contain mercury.

LEDs enable one to distribute the light closer to the target which can result in less loss through the roof and into the floor of the greenhouse. Moreover a better light distribution in the crop can be accomplished. This is certainly the case for high-wire crops like tomatoes.

The first light generating part is configured to provide first light having a first spectral light distribution with at least light intensity at said first wavelength. The second light generating part may be configured to provide second light, having a second spectral light distribution with at least light intensity at a red wavelength selected from the range of 625-675 nm and/or at a far red wavelength, larger than the red wavelength, selected from the range of 675-750 nm.

Especially both wavelength ranges may be represented and may be part of the horticulture light (especially the second light).

As indicated above, the lighting device comprises two or more light generating parts. Here, the term "light generating part" especially refers to parts of the lighting device that have the function of providing light (to the crop). There are at least two different light generating parts that are in general adjacent to each other. At least one light generating part provides the first light, and at least another light generating part provides the second light.

In an embodiment, the first light generating part and the second light generating part have an elongated shape and are arranged parallel. For instance, two or more elongated light generating parts may be present. In this way, a lighting device may be provided wherein strips may provide light with different spectral light distributions.

The lighting device may (also) comprise a plurality of first light generating parts and a single second light generating part. Alternatively, the lighting device comprises a single first light generating part and a plurality of second light generating parts. Especially, the lighting device comprises a plurality of first light generating parts and a plurality of second light generating parts.

These plurality of first light generating parts and second light generating parts may be arranged parallel (as elongated light generating parts arranged adjacently), but may also be arranged in a chess board way. Hence, in an embodiment the first light generating parts and the second light generating parts are configured in a 2D array of alternating first light generating parts and second light generating parts (such as elongated parallel arranged light generating parts or chess board arrangement). An advantage of especially the latter is that dedicated parts of the crop or the horticulture arrangement (see below) may be illuminated with a "high" spatial resolution. With about the same resolution, color can be chosen and dosed at the right position. Hence, the lighting device may comprise "color pixels", that can be switched on and off, by which the spectral intensity distribution of the horticulture light can be varied, as a function of one or more of (a) the addressed part of the crop, (b) the time of the day, (c) the light intensity and light distribution of other light than the horticulture light, (d) the type of crop, (e) the growth stage of the crop, (f) the stage of a fruit (of the crop), (g) the time to harvest, (h) the time from harvest, and (i) position in horticulture arrangement (comprising a plurality of crops).

Not only at least two types of light can be provided, also three or more types of light may be provided (see also above). Hence, the lighting device may for instance also comprise a third light generating part, comprising a third subset of the plurality of light emitting diodes, the third light generating part configured to provide third light having a spectral light distribution which differs from the first spectral light distribution and the second spectral light distribution, wherein the three or more subsets of the plurality of light emitting diodes are independently controllable. Likewise, the device may comprise a fourth, fifth, etc. light generating part. Each additional light generating part may provide its own type of light, dependent upon the luminescent material included (see below). Especially, the first light generating part (see also above), is configured to provide light with at least light in intensity in the first wavelength range. The second light generating part may be configured to provide light having a second spectral light distribution with at least intensity in the range of 625-675 nm, and the third light generating part may be configured to provide light having a third spectral light distribution with at least intensity at a far red wavelength, larger than the red wavelength, selected from the range of 675-750 nm. However, the optional third or further light generating parts may also be configured to provide light having other wavelengths (e.g. from the PAR).

The light generating parts may, especially in the case of a chess board arrangement, have surfaces from which light is emitted having areas in the range of e.g. 4-900 $cm^2$, especially 4-400 $cm^2$. For instance, dimensions in the range of 10×10 to 30×30 $cm^2$ may be chosen.

The light generating parts, especially the respective surfaces from which light is emitted, providing the same type of light may have a pitch, i.e. a mutual distance (especially assuming a regular arrangement) between two nearest neighboring light generating parts of the same type. In a specific embodiment the plurality of light generating parts are arranged according to a given pitch and are arranged at a mean distance from the crop(s), wherein the ratio of distance over pitch is at least 0.2, especially at least 0.25, such as at least 0.3. By tuning the pitch and/or the distance from the light generating parts to the crop, optimal lighting may be provided. It appears that below this ratio, lighting may be less homogenous than desired, and that above this ratio, lighting is homogenous enough. The lighting device and/or crops may be arranged in such a way, that the distance over pitch ratio requirement is fulfilled during a substantial part of the lifetime of the crop. In a specific embodiment, the plurality of light generating parts have a pitch in the range of 5-30 cm, even more especially 5-25 cm, such as 20 cm. In this way, light received by the crop(s) may be substantially homogeneously distributed. The skilled person will appreciate that also optical light distribution properties of the light generating parts, such as for example a light emission angle of the LEDs, a light diffusing/scattering property of the light mixing chamber (see below), an optical property of the foil (see later) comprising the converter material etc., need to be taken into account—next to the distance over pitch ratio—to determine a suitable position of the lighting device relative the plant in order to obtain a homogeneous light distribution at the plant.

As indicated above, the second light generating part comprises a second subset of the plurality of light emitting diodes wherein downstream the optical path of each LED of the second subset of the plurality of light emitting diodes a light conversion element is configured. This light conversion element is configured to convert at least part of the LED light into converted light with the second wavelength. This converted light is at least partly comprised in the second light. Hence, the second light generating part is configured to provide second light, comprising at least part of said converted light. In this way, the second light may have a second spectral light distribution with at least light intensity at said second wavelength. In this way, the spectral light distribution of the second light may differ from the spectral light distribution of the first light. Thus, due to the fact that the second light comprises at least part of the converted light, the second light provides light having a spectral light distribution in at least the second wavelength range.

The light conversion element comprises a luminescent material or converter material that converts the first light at least partly into second light. In general, converter material will not be applied in the first light generating part, but only in the second light generating part, and optionally further converter materials further light generating parts. This light conversion element is arranged downstream the optical path of the second subset of the plurality of LEDs.

The terms "upstream" and "downstream" the optical path relate to an arrangement of items or features relative to the propagation of the light from a light generating means (here the especially the first light source), wherein relative to a first position within a beam of light from the light generating means, a second position in the beam of light closer to the light generating means is "upstream", and a third position within the beam of light further away from the light generating means is "downstream".

A second light generating part may comprise more than one LED, each of these LEDs being arranged upstream the optical path with respect to a same light conversion element. However, when there are a plurality of second light generating parts, each second light generating part may comprise one or more LEDs. Likewise, this may also apply to the optional further light generating parts.

The light conversion element converts at least part of the LED light. The luminescent material may be an inorganic luminescent material, but may especially comprise an organic luminescent material. Optionally, the light conversion element may comprise both an organic and inorganic material. The terms "luminescent material" or "converter material" may also relate to a plurality of such material(s). Further, optionally a further luminescent material is used to assist the conversion into light with the second wavelength. For instance, part of the LED light may be converted in light having an intermediate wavelength, which light of intermediate wavelength is at least partly further converted by a (in)organic luminescent material in light with the second wavelength. Especially, the light conversion element comprises an organic dye configured to convert at least part of the LED light into coverted light with the second wavelength. Below a number of dyes are listed, of which one or more of the red ones may be applied in or as light conversion element, and of which the others may optionally be applied in the first light generating part(s) or second light generating part(s), or may be present in light conversion element(s) of optional further light generating parts.

There is a nearly unlimited assortment of such organic luminescent materials or dyes. Relevant examples are perylenes (such as dyes known under their trade name Lumogen from the company BASF, Ludwigshafen, Germany: Lumogen F240 Orange, Lumogen F300 Red Lumogen F305 Red, Lumogen F083 Yellow, Lumogen F170 Yellow, Lumogen F850 Green), Yellow 172 from the company Neelikon Food Dyes & Chemical Ltd., Mumbai, India, and dyes such as coumarins (for example Coumarin 6, Coumarin 7, Coumarin 30, Coumarin 153, Basic Yellow 51), napthalimides (for example Solvent Yellow 11, Solvent Yellow 116), Fluorol 7GA, pyridines (for example pyridine 1), pyrromethenes (such as Pyrromethene 546, Pyrromethene 567), uranine, rhodamines (for example Rhodamine 110, Rhodamine B, Rhodamine 6G, Rhodamine 3B, Rhodamine 101, Sulphorhodamine 101, Sulphorhodamine 640, Basic Violet 11, Basic Red 2), cyanines (for example phthalocyanine, DCM), stilbenes (for example Bis-MSB, DPS), available from many traders.

Organic materials of special interest that may be applied comprise for instance perylene structures similar to such as BASF Lumogen 83 for green luminescence, BASF Lumogen F170 for yellow luminescence, BASF Lumogen F 240 for orange luminescence, and BASF Lumogen F 300 or F305 for red luminescence, but also Lumogen F Red 305 or Lumogen F Blue 650.

Optionally, the dye comprises a phosphorescent dye, that has a long decay time, such as hours, which may be applied for lighting during absence of (enough) daylight.

Note that the light conversion element may have light transmissive properties, and may in an embodiment be configured to also transmit part of the LED light without converting.

The dye(s) may be comprised in a light conversion element plate or in a light conversion element foil. Especially a foil may be of interest. The dye may be contained in the foil or may be provided on the foil. The dye may also be sandwiched between foils. For instance, the dye(s) may be printed on a foil. By printing a pattern on a foil, the pattern, when aligned with the two (or more) subsets of the plurality of light emitting diodes, allows the generation of different types of light by driving the two (or more) subsets of the plurality of light emitting diodes. Hence, in an embodiment the light conversion element is comprised in a foil. Thus, the foil may comprise the light conversion element From such embodiments, it appears that downstream the optical path of each (at least one) LED of the first subset of the plurality of light emitting diodes, also a layer may be present. This layer may especially be configured to transmit substantially all of the light from the respective LED(s). Hence, downstream the optical path of each LED of the first subset of the plurality of light emitting diodes a light transmissive element may be configured, wherein the light transmissive element is configured to transmit at least part of the LED light. As indicated above, the light transmissive element may also be comprised in a foil. Therefore, the foil may comprise the light transmissive element(s) for the first light generating part and the light conversion element(s) for the second light generating part. Hence, a single foil can be used, comprising both the light conversion element(s) and the light transmissive element(s). As may be clear from the above, when a plurality of first and second light generating parts are available in an arrangement (e.g. a pattern), the light conversion elements and the light transmissive elements may be arranged in a corresponding arrangement (e.g. pattern). The arrangement may comprise a parallel pattern (as elongated light generating parts), but may also comprise a chess board pattern. Instead of the term "chess", also the term checker may be applied.

The light transmissive element(s) and/or the light conversion element(s) of the light generating parts may be considered the element(s) that provide the first respectively second light and thus can be considered the light emissive part(s) of the device. Hence, the first and the second light generating parts, or at least their light emissive parts, may be configured in a 1D or 2D alternating arrangement of said parts.

Note that the light transmissive part may also be configured to convert part of the LED light. However, as indicated above, the light transmissive part at least transmits at least part of the LED light, and in general will transmit a substantial part of that light. In a specific embodiment, the light transmissive element does not contain a dye, or at least not one of the above indicated dyes.

Especially, the LEDs may be configured in light chambers, i.e. in cavities with walls that are reflective (the walls may be diffuse and/or specular reflective). Especially in the case of a light conversion element arranged downstream the optical path of the LED, such chamber may be of use to redirect LED light reflected or refracted at the light conversion element (and to recycle light that is emitted by the conversion element back into the chamber.). Hence, in an embodiment the plurality of light emitting diodes are configured in a plurality of light chambers. However, one chamber may comprise a plurality of LEDs. Hence, the phrase "downstream the optical path of each LED of the first subset of the plurality of light emitting diodes a light transmissive element is configured" may refer to a combination or one or more LEDs and a single light transmissive element, or to a plurality of LEDs and a plurality of radiationally coupled light transmissive element. In the latter embodiment, still more than one LED may radiationally be coupled to the same light transmissive element.

As indicated above, the invention also provides a method of illuminating crop comprising illuminating at least part of the crop with horticulture light from the lighting device according to any one of the preceding claims. Especially, the method may comprise varying the spectral intensity distribution of the horticulture light as a function of one or more of (a) the addressed part of the crop, (b) the time of the day, (c) the light intensity and light distribution of other light than the horticulture light, (d) the type of crop, (e) the growth stage of the crop, (f) the stage of a fruit, (g) the time to harvest, (h) the time from harvest, and (i) position in horticulture arrangement (comprising a plurality of crops).

The term "horticulture" relates to (intensive) plant cultivation for human use and is very diverse in its activities, incorporating plants for food (fruits, vegetables, mushrooms, culinary herbs) and non-food crops (flowers, trees and shrubs, turf-grass, hops, grapes, medicinal herbs). The term "crop" is used herein to indicate the horticulture plant that is grown or was grown. Plants of the same kind grown on a large scale for food, clothing, etc., may be called crops. A crop is a non-animal species or variety that is grown to be harvested as e.g. food, livestock fodder, fuel, or for any other economic purpose. The term "crop" may also relate to a plurality of crops. Horticulture crops may especially refer to food crops (tomatoes, peppers, cucumbers and lettuce), as well as to plants (potentially) bearing such crops, such as a tomato plant, a pepper plant, a cucumber plant, etc. Horticulture may herein in general relate to e.g. food crop and non-food crop plants. Examples of crop plants are Rice, Wheat, Barley, Oats, Chickpea, Pea, Cowpea, Lentil, Green gram, Black gram, Soybean, Common bean, Moth bean, Linseed, Sesame, Khesari, Sunhemp, Chillies, Brinjal, Tomato, cucumber, Okra, Peanut, Potato, Corn, Pearlmillet, Rye, Alfalfa, Radish, Cabbage, lettuce, pepper, Sunflower, Sugarbeet, Castor, Red clover, White clover, Safflower, Spinach, Onion, Garlic, Turnip, Squash, Muskmelon, Watermelon, Cucumber, Pumpkin, Kenaf, Oilpalm, Carrot, Coconut, Papaya, Sugarcane, Coffee, Cocoa, Tea, Apple, Pears, Peaches, Cherries, grapes, Almond, Strawberries, Pine apple, Banana, Cashew, Irish, Cassava, Taro, Rubber, Sorghum, Cotton, Triticale, Pigeonpea, and Tobacco. Especial of interest are tomato, cucumber, pepper, lettuce, water melon, papaya, apple, pear, peach, cherry, grape, and strawberry. However, other types are not excluded.

Horticulture is especially applied in a greenhouse. The invention especially relates to the application of the device and/or the method in a greenhouse. The device may be arranged between plants, or between plants to be, which is indicated as "inter lighting". Horticulture growth on wires, like tomato plants, may be a specific field of inter lighting that may be addressed with the present device and method. The device may also be arranged over plants or plants to be. Especially when horticulture is performed in layers over each other, artificial lighting is necessary. Growing in layers is indicated as "multi-layer growth". Also in multi-layer growth, the device and/or method may be applied.

The invention provides a new way of artificial lighting used to stimulate plant growth and/or development, a technique that is indicated as horticultural lighting. In particular, there are two major horticultural environments in which artificial lighting is used. Firstly, greenhouses increase crop yields using top lighting and intracanopy lighting in addition to daylight. Secondly, in multilayer systems the crops grow mainly without daylight and, thus, depend heavily on artificial lighting. In this invention disclosure we consider optimized LED-based supplemental lighting devices or luminaires for high-wire crops in greenhouses like tomatoes, cucumbers, and sweet peppers (paprikas) as well as for multi-layer growth in plant factories.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

Figure 4:
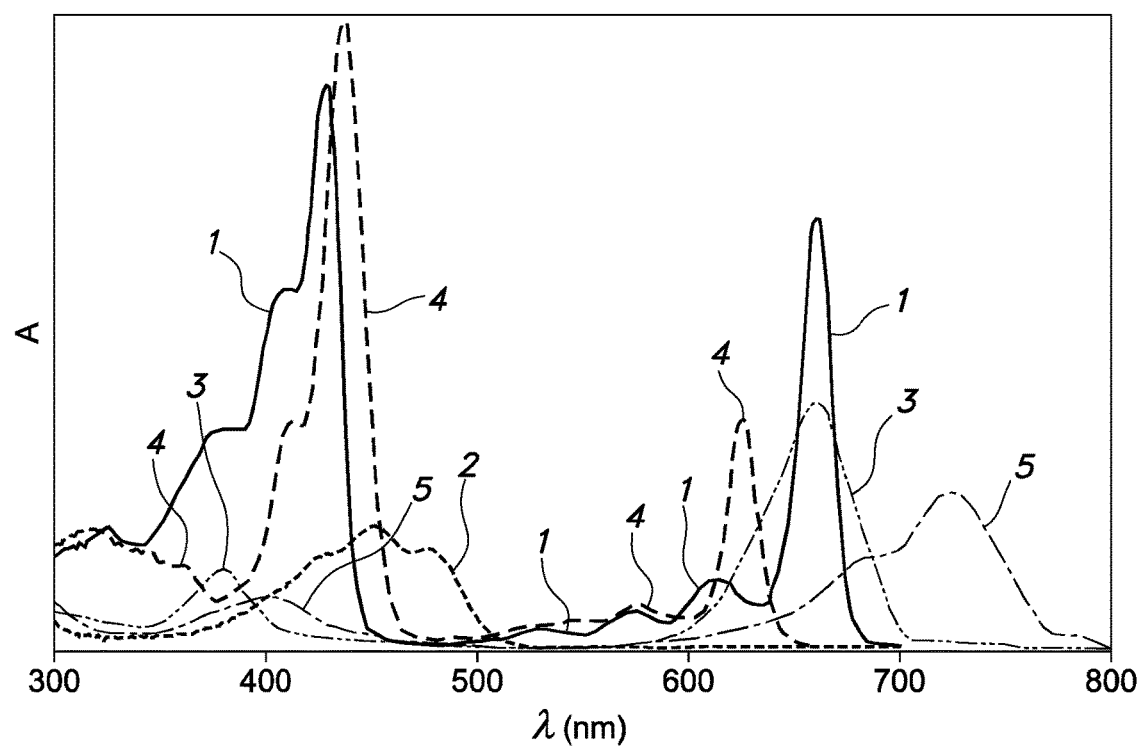

FIG. 4 depicts relative absorption spectra of some common photoreceptors in green plants.

DETAILED DESCRIPTION OF THE EMBODIMENTS

Figure 1A:
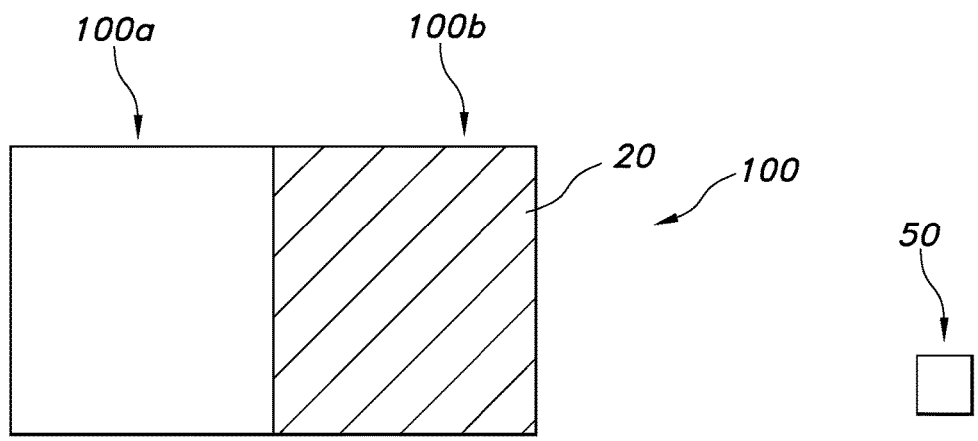
FIGS. 1a-1c schematically depict some devices and variants.
Figure 1B:
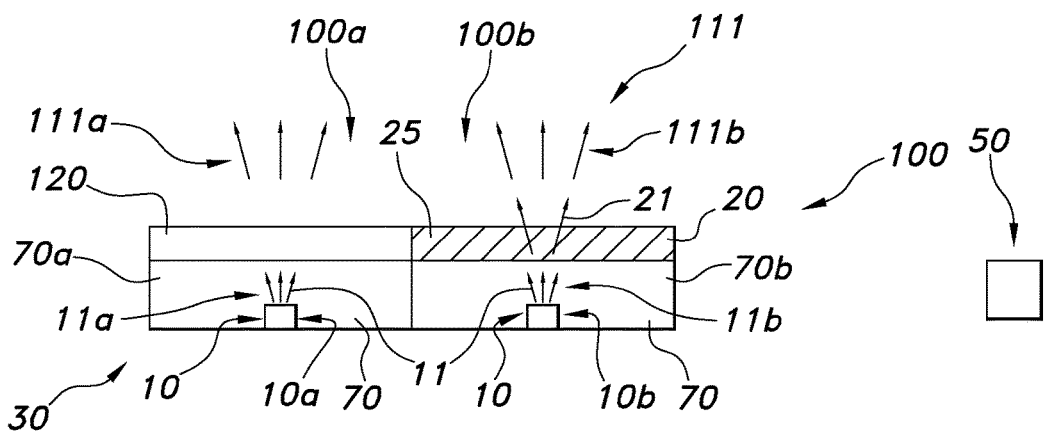

FIGS. 1a and 1b schematically depicts an embodiment of a lighting device 100 ("device 100") capable of providing horticulture light 111 (see FIG. 1b). FIG. 1a can be seen as a variant of a top view of the device schematically depicted in FIG. 1b.

Especially, this horticulture light 111 has a spectral light distribution with at least light intensity at a first wavelength selected from the range of 400-475 nm, such as 440-470, or 425-475 nm, and at a second wavelength selected from the range of 625-800 nm, wavelengths dependent upon e.g. the type of plant or the growth stadium, etc.

The lighting device 100 comprising a plurality of light emitting diodes (LEDs) 10 configured to generate LED light 11 having a wavelength selected from said range of 400-475 nm.

The plurality of light emitting diodes 10 are configured in an array 30 (especially a 2D array, i.e. a n×m array of e.g. n at least 4, and m at least 4). The lighting device 100 comprises at least two light generating parts. A first light generating part 100a comprises a first subset 10a of the plurality of light emitting diodes 10. Especially, the first light generating part 100a is configured to generate first light 111a having a first spectral light distribution with at least light intensity at said first wavelength. A second light generating part 100b comprises a second subset 10b of the plurality of light emitting diodes. Downstream the optical path of each LED of the second subset 10b of the plurality of light emitting diodes 10 a light conversion element 20 is configured. The light conversion element 20 is configured to convert at least part of the LED light 11b into converted light 21 with the second wavelength. Hence, the second light generating part 100b is configured to provide or emit second light 111b, comprising at least part of said emission light 21 or even essentially consisting of said emission light 21. The second light 111b has a second spectral light distribution with at least light intensity at said second wavelength. First light 111a and/or second light 111b are considered to be horticulture light 111.

The two or more subsets 10a, 10b of the plurality of light emitting diodes 10 are independently controllable. To this end, control unit 50 may be applied, which may be part of the lighting device 100 or which may be a remote control unit (as schematically depicted).

Reference 11a and 11b refer to the LED light of the first subset of LED(s) and second subset of LED(s), respectively. Reference 25 refers to luminescent material or converter material, such as an organic dye suitable to generate e.g. red light upon excitation by e.g. blue light generated by the LEDs of the second subset. Reference 120 refers to a transmissive cover (especially not comprising a luminescent material). Reference 70 refers to a (light) chamber. Note that both first and second light generating parts comprise in this example such chamber(s). Hence, the respective chambers are indicated with references 70a,70b wherein the former is linked with said transmissive element configured downstream the optical path of the LED(s) of the first subset, and the latter is linked with said light conversion element, configured downstream the optical path of the LED(s) of the second subset.

Figure 1C:
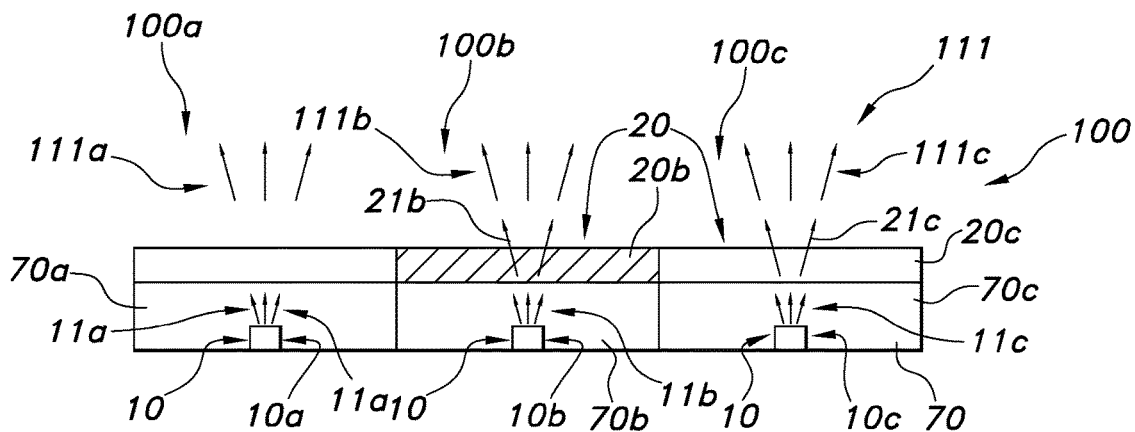

FIG. 1c schematically depicts an embodiment with a third light generating part 100c, also comprising a light conversion element 20, but differing from the light conversion element of the second light generating part. Hence, the light conversion element of the second light generating part is indicated with reference 20b and the light conversion element of the third light generating part is indicated with reference 20c. Light generated by the third subset of LEDs is indicated with reference 11c. This light 11c is at least partly converted by the light conversion element 20c into third light 111c. Likewise, further light generating parts may be present.

Figure 2A:
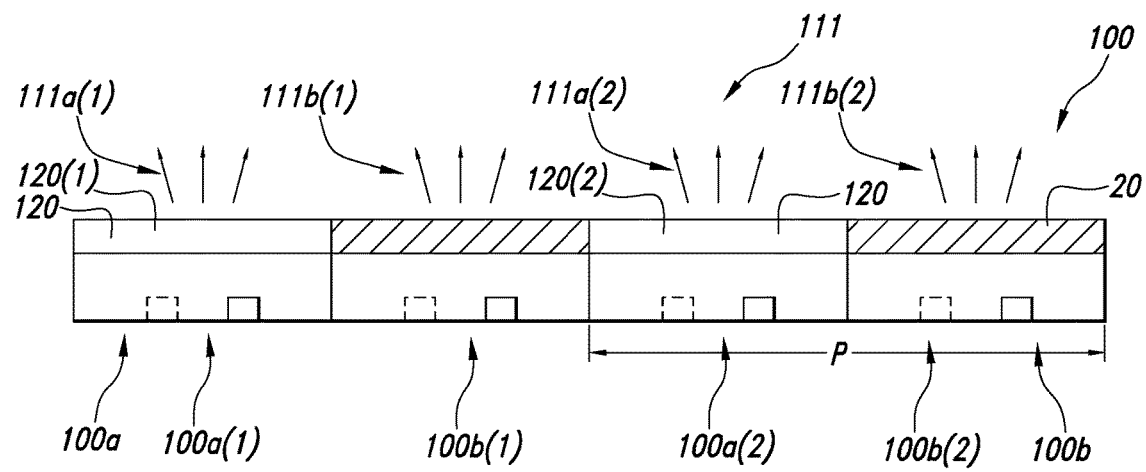
FIG. 2a-2d schematically depict some further devices and variants.

FIG. 2a schematically depicts a side view of an embodiment of the device 100 with a plurality of first light generating parts and a plurality of second light generating parts. To distinguish between different first light generating parts or to distinguish between different second light generating parts, the indications (1), (2), (3) . . . are applied. Note that elongated light generating elements may be applied, see FIG. 2b, or a kind of chess board arrangement may be applied, see FIG. 2c. The pitch of the transmissive covers 120, or of the conversion element 20, or in this example also the first light generating parts 100a and second light generating parts 100b, respectively, is indicated with reference P. In case of a chess board, or other regular 2D arrangement of the light generating parts, there may be a pitch in two directions, indicated with Px and Py (see FIG. 2c). For instance, the pitch P may be in the range of 5-30 cm.

Figure 2B:
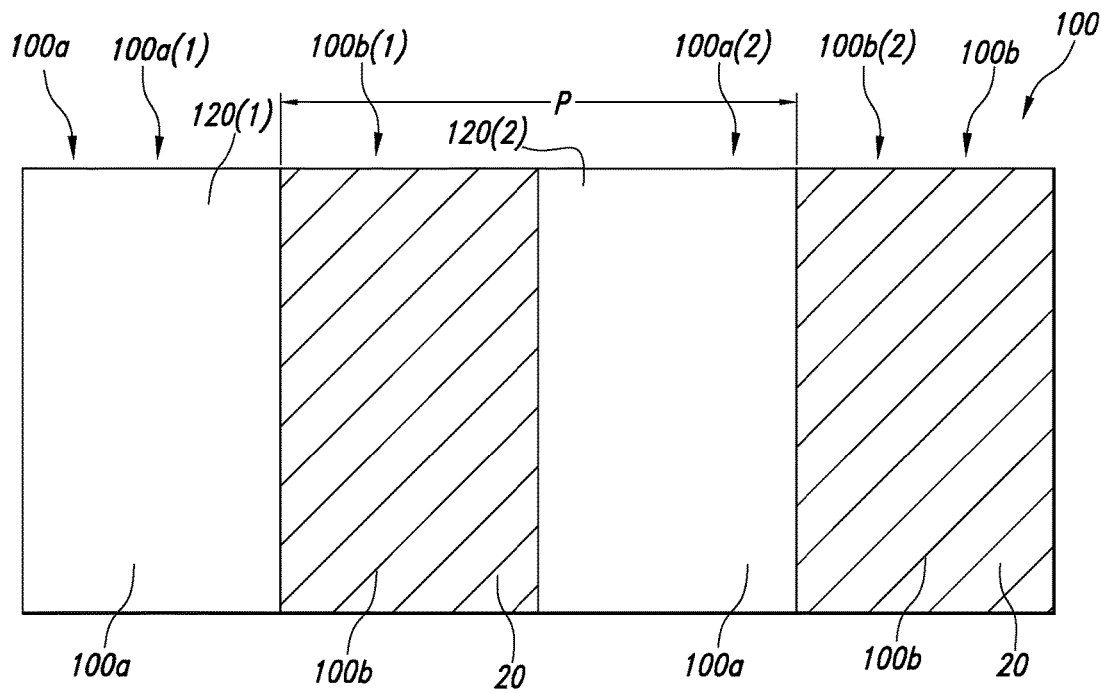
Figure 2C:
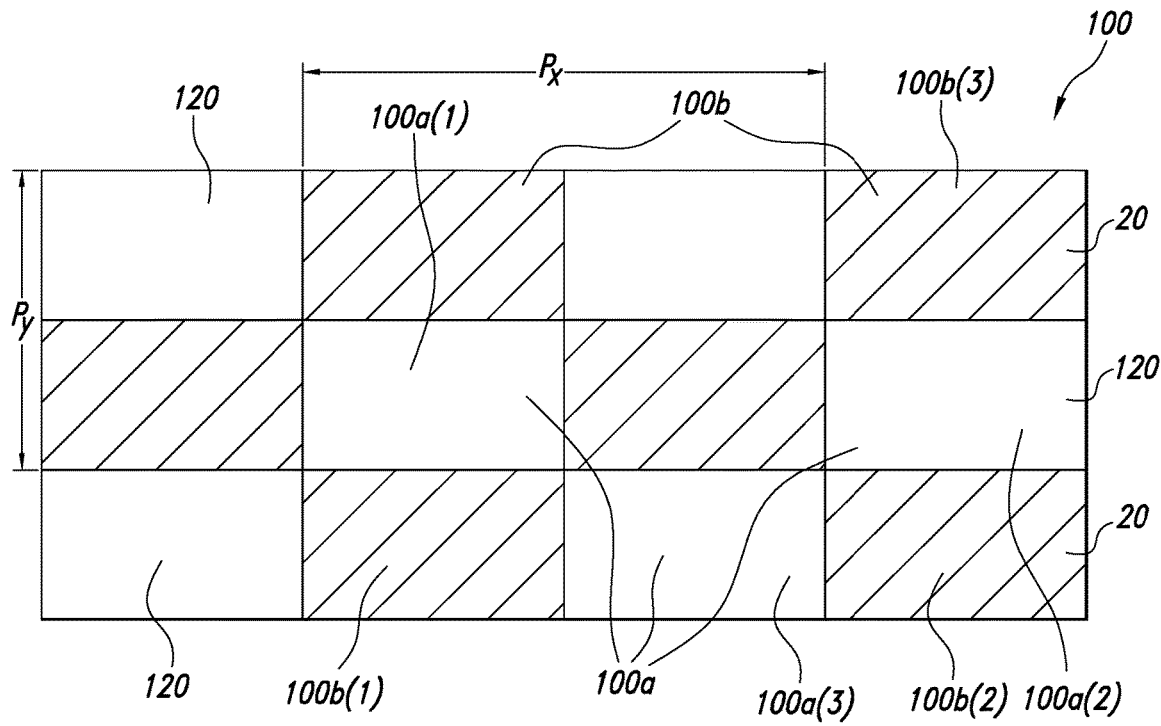
Figure 2D:
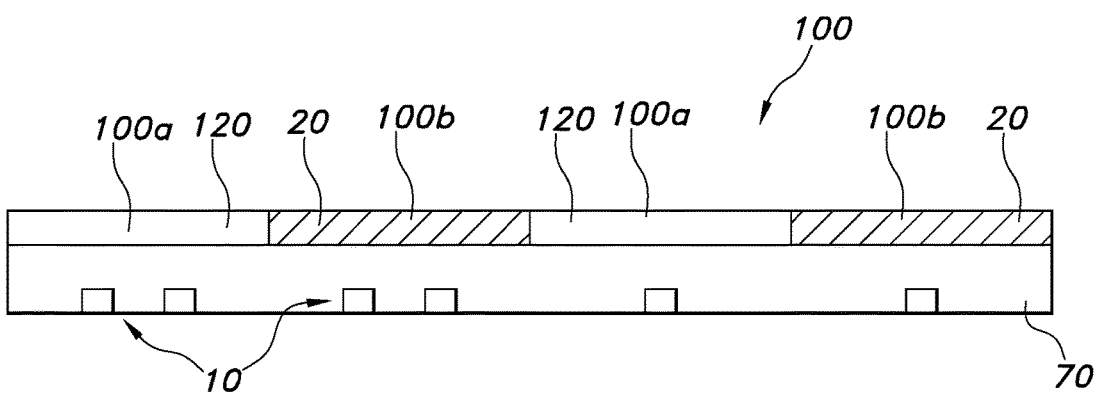

FIGS. 2a-2c show a plurality of chambers. However, there may be less chambers than there are (first) light generating part(s) and (second) light generating part(s). This is shown in FIG. 2d.

The device 100 may also contain a LED module with blue LEDs and a cover optical foil on which organic phosphors are deposited preferentially in different regions. By depositing different organic phosphors on the cover, the blue light generated by the LED module is converted to the necessary wavelength lights to the plants.

Figure 2E:
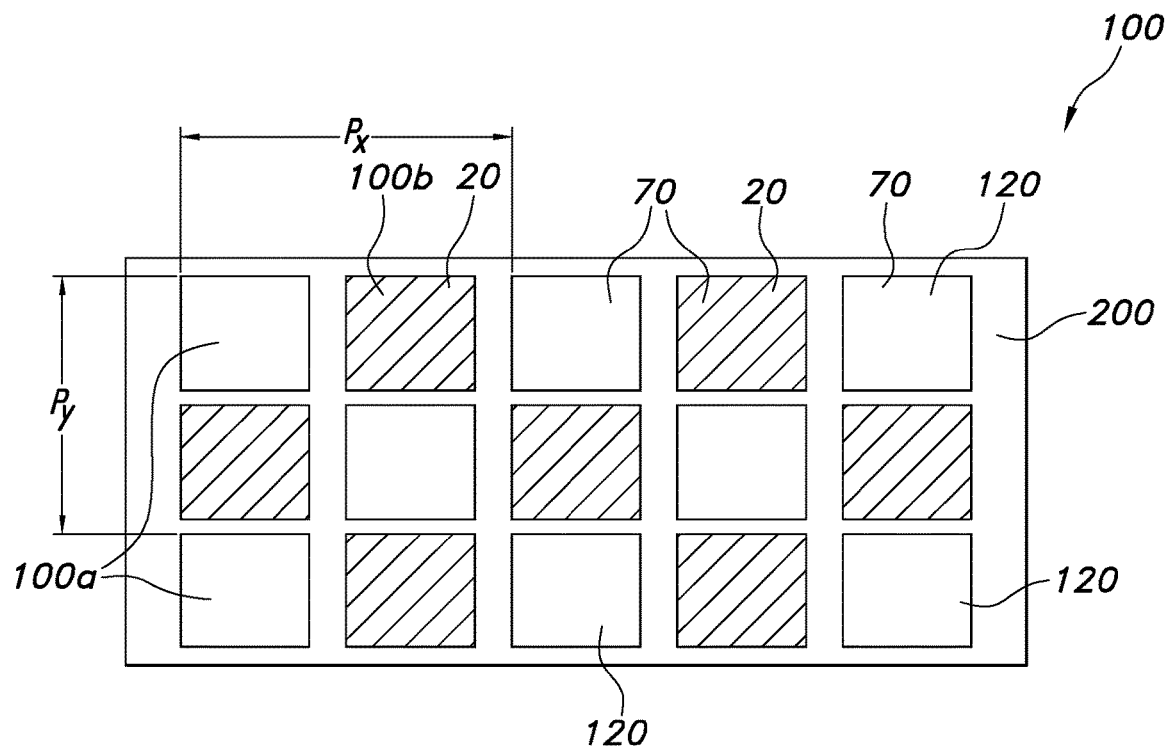
FIGS. 2e-2f schematically depict a specific device.
Figure 2F:
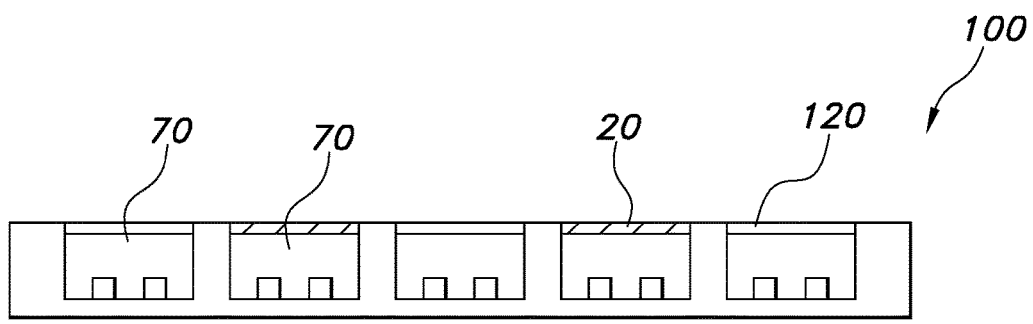

Realization of such lighting device by positioning the organic phosphors converting foil as discrete elements is shown in the embodiment schematically depicted in FIGS. 2e-2f. In this case, the overall spectral light distribution of the device 100 can be tuned by adjusting the current through the LEDs operatively coupled to the transmissive elements 120 or the light conversion elements 20; the transmissive elements emitting e.g. bluish light and the light conversion elements emitting e.g. reddish light. Using this approach it is possible to tune the specific color and spectral characteristics that is needed for plant cultivation. In this configuration the red converted areas may preferentially show full conversion (less than 10%, especially less than 1% blue leakage). However, it may also be partial blue conversion with blue light leaking through. Schematic drawings of such embodiments are shown in FIGS. 2e-2f (front view and side view, respectively).

Figure 2G:
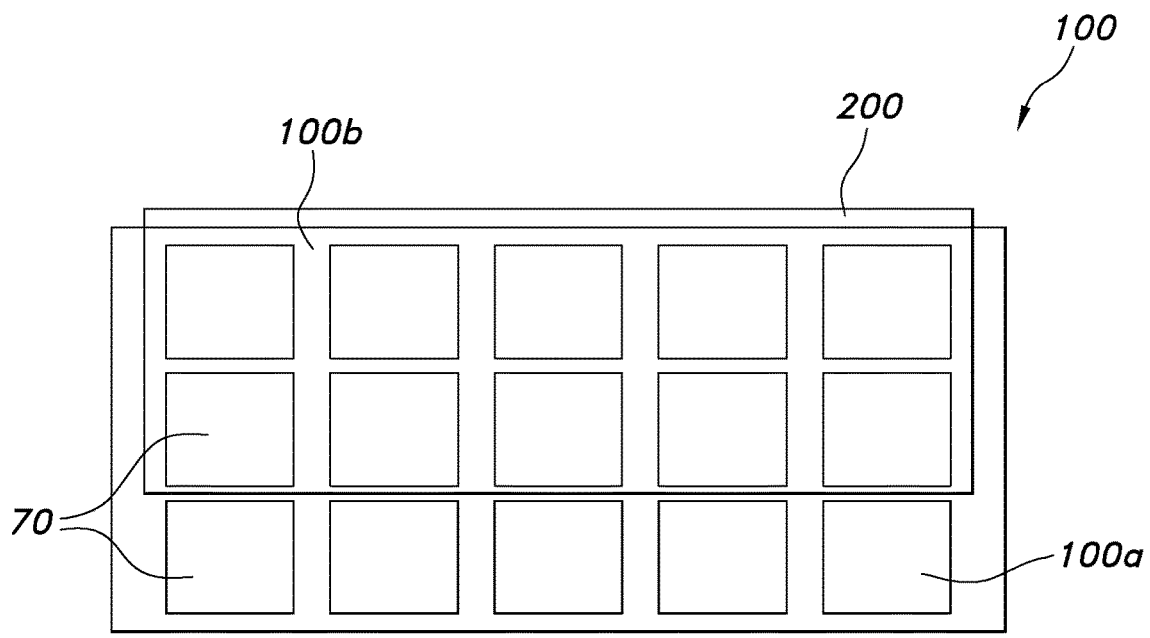
FIGS. 2g-2h schematically depict a construction that may also be applied.
Figure 2H:
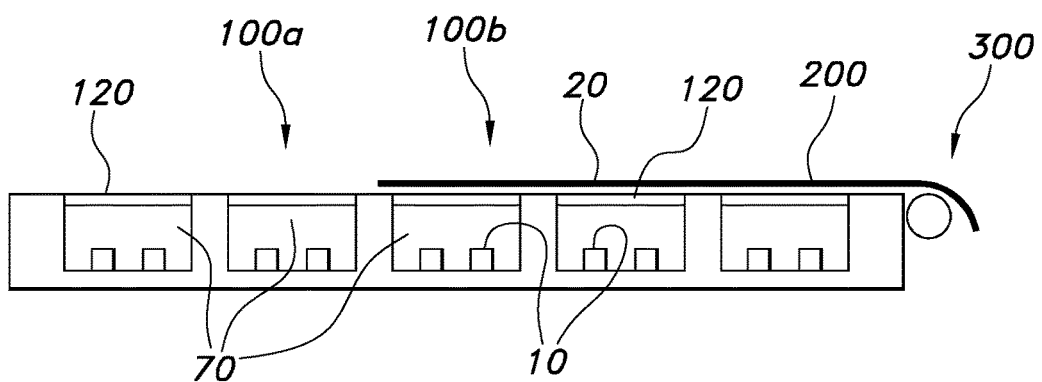

Another embodiment for realization the same effect may comprise positioning a foil 200 comprising a light conversion element 20 such that it can be extracted and retracted with respect to a plurality of light emitting diodes. In this case, the spectral light distribution can be tuned by adjusting the area or the number of LEDs of the plurality of light emitting diodes that is covered by the foil. This configuration can also be realized in the reflective mode where the light conversion element is placed between a reflector and LEDs facing the reflector. The reflector can add in homogenizing the light distribution output from the device. Here, a retractable foil is shown, with a retraction mechanism 300, configured to transport the foil to obtain the desire light distribution of the horticulture light at the desired position. Schematic drawings of such embodiments are shown in FIGS. 2g-2h (front view and side view, respectively). Note that a first light generating part may become a second light generating part, and vice versa, dependent upon the position of the (retractable) foil.

Figure 3:
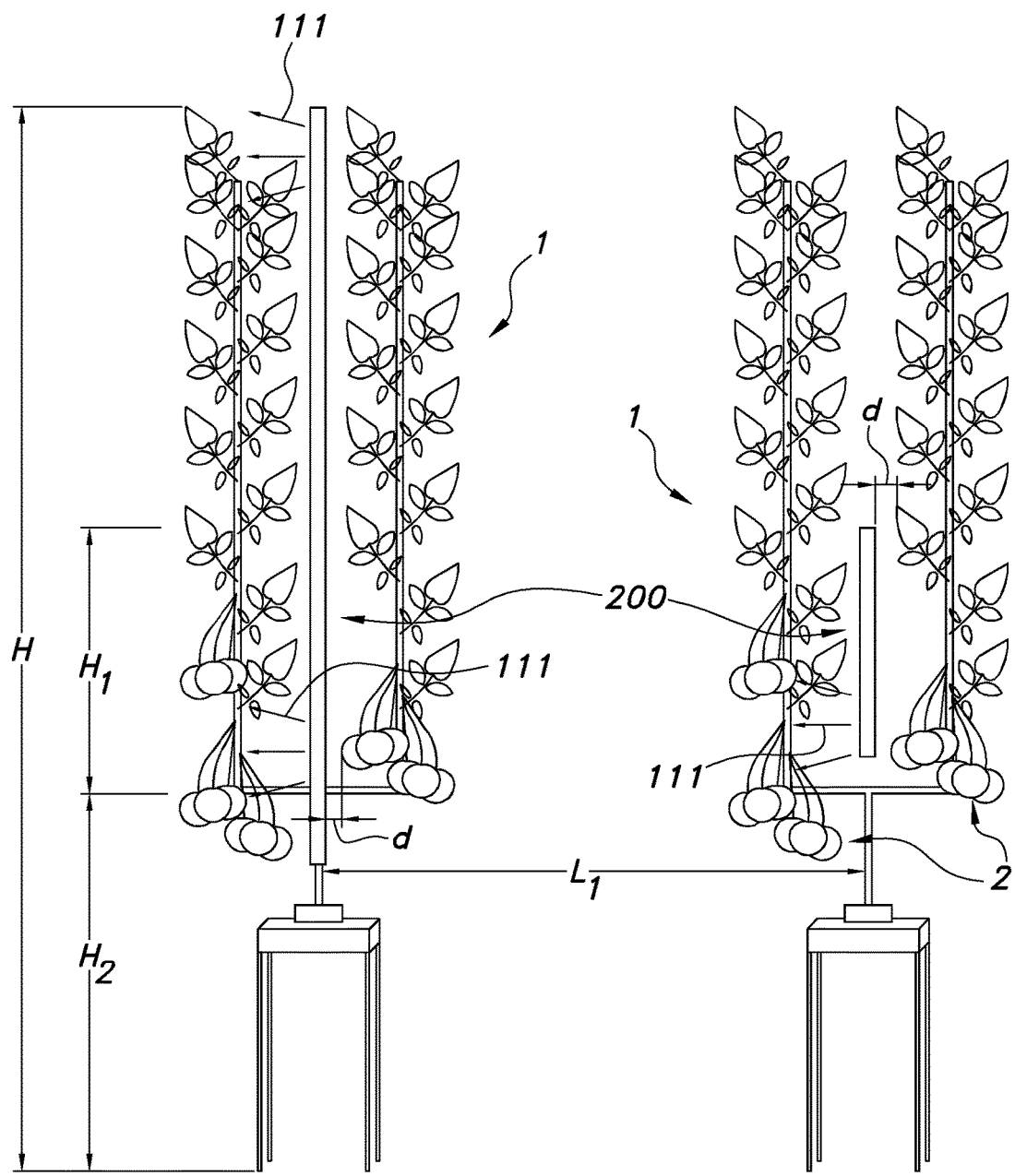
FIG. 3 schematically depict some aspects of inter lighting.

FIG. 3 schematically depicts a horticulture application with for instance tomato growth. The crop or plant is indicated with reference 1. Reference 2 indicates the tomatoes. The distance between different rows of plants is indicated with reference L1, and can for instance be in the range of 1-2 m, such as 1.5 m. The total height, indicated with reference H may e.g. be in the range of 2-4 m, such as about 3 m. The relevant part for lighting has height H1, and is in the range of 0.5-1 m, and is about height H2 above a floor, which height H2 may be in the range of 0.5-1.5 m, especially about 1 m. The lighting device 200 may especially address the crop over said height H1 as illustrated in the right side of the figure. On the left side, a less preferred embodiment is illustrated wherein a relative large (high) lighting device 200. The distance between the lighting devices 200 and the crop 1 is indicated with reference d, and may for instance be in the range of 10-50 cm.

FIG. 4 depicts relative absorption spectra of some common photoreceptors in green plants, with 1 representing chl a, 2 representing Beta carotene, 3 representing phytochrome (Pr), 4 representing chl b, and 5 representing phytochrome (Pfr). On the x-axis the wavelength is represented and on the y-axis the absorption of those photoreceptors (in arbitrary units).

Hence, in embodiments, with the goal to enhance the growth and development of crops in horticulture applications, a light emitting device is proposed that has the following properties:
(i) The device consists of a multitude of compact light emitting devices that emit radiation in the wavelength range between 400-475 nm, especially 440 nm or 470 nm.
(ii) The light emitting devices can be placed in a multitude of small discrete volumes (mixing chamber) or in one large volume.
(iii) By means of covering a fraction of the light emitting devices with wavelength converting elements, the integral emitted light spectrum can be tuned such as to match over time the lighting demands of the irradiated plants.
(iv) Wavelengths are converted from the initially bluish color to the red part of the light spectrum, i.e., 630 nm and longer, towards 660 nm.
(v) By separating the wavelength conversion process from the light emitting devices, the energy efficiency of the total irradiation device increases compared to devices incorporating different directly color-converted light emitting devices.

LEDs may be configured to emit radiation within a narrow wavelength spectrum. Light modules as suggested herein (for inter-lighting) may in an embodiment also use a combination of LEDs having an emission peak at 450 nm (blue), 660 nm (red), and 730 nm (far-red). Blue light seems to govern leaf formation, whereas red and far-red seems to promote stem growth and flowering (flowering also strongly depends on the timing of the lighting; flowering can be induced by appropriate timing of the lighting).

This invention can be applied in horticulture for providing supplemental illumination in greenhouses (a major part of the horticulture market) as well as for multi-layer lighting in plant factories.

The invention claimed is:

1. A lighting device for providing horticulture light having a spectral light distribution with a light intensity within a first wavelength range of 400-475 nm and within a second wavelength range of 625-800 nm, the lighting device comprising:
    a plurality of light emitting diodes (LEDs) configured to generate LED light having a wavelength essentially within said range of 400-475 nm, wherein the plurality of light emitting diodes are configured in an array,
    the lighting device further comprising at least two light generating parts:
    a first light generating part consisting of a first subset of the plurality of light emitting diodes, wherein the first light generating part is configured to provide first light having a first spectral light distribution with a light intensity essentially within said first wavelength range, and
    a plurality of second light generating parts wherein each second light generating part consists of a second subset of the plurality of light emitting diodes, wherein downstream of the optical path of each LED of the second subset of the plurality of light emitting diodes a light conversion element is configured, the light conversion element configured to convert at least part of the LED light generated by the second subset of the plurality of light emitting diodes into converted light having a wavelength that is essentially within the second wavelength range, wherein the second light generating part is configured to provide second light, consisting essentially of said converted light,
    wherein the light conversion element is noncontiguous with any light emitting surface of each LED of the second subset, and
    wherein the spectral light distributions, in the first wavelength range and the second wavelength range, of the first light and the second light are different,
    the lighting device further comprising a control unit whereby the first subset of the plurality of light emitting diodes and the second subset of the plurality of light emitting diodes are independently controllable to thereby enable electronically controlling the intensity of the first light and the second light.

2. The lighting device according to claim 1, wherein the light conversion element comprises an organic dye configured to convert at least part of the LED light generated by the second subset of the plurality of light emitting diodes into said converted light with the second wavelength.

3. The lighting device according to claim 1, wherein the second light has a resulting spectral light distribution with at least light intensity at a first red wavelength range of 625-675 nm and at a second red wavelength range of 675-750 nm.

4. The lighting device according to claim 1, wherein the light conversion element comprises a foil.

5. The lighting device according to claim 1, wherein downstream of the optical path of each LED of the first subset of the plurality of light emitting diodes, a light transmissive element is configured, the light transmissive element configured to transmit at least part of the LED light.

6. The lighting device according to claim 1, wherein the first light generating part is arranged parallel to each of the plurality of second light generating parts.

7. The lighting device according to claim 1, wherein the first subset further comprises a plurality of the light emitting diodes and wherein the second subset further comprises a plurality of the light emitting diodes.

8. The lighting device according to claim 1, comprising a plurality of first light generating parts, wherein each of the second light generating parts has an associated light conversion element that is not shared by other second light generating parts.

9. The lighting device according to claim 8, wherein first light generating parts and the second light generating parts are configured in a 2D array of alternating first light generating parts and second light generating parts.

10. The lighting device according to claim 1, wherein each of the plurality of light emitting diodes of the lighting device is configured to only generate the LED light having a wavelength selected from said range of 400-475 nm.

11. The lighting device according to claim 1, wherein the horticulture light provided by the lighting device provides a tunable mix of light intensity at said first wavelength and light intensity at said second wavelength.

12. The lighting device according to claim 1, wherein the lighting device comprises a plurality of second light generating parts arranged with a pitch distance (p) between two nearest neighboring second light generating parts in the range of 5-30 cm.

13. A lighting device for providing horticulture light having a spectral light distribution with a light intensity at a first wavelength within a range of 400-475 nm and at a second wavelength within a range of 625-800 nm, the lighting device comprising:
 a plurality of light emitting diodes (LEDs) configured to generate LED light having a wavelength essentially within said range of 400-475 nm, wherein the plurality of light emitting diodes are configured in an array,
 the lighting device further comprising at least two light generating parts:
  a first light generating part consisting of a first subset of the plurality of light emitting diodes, wherein the first light generating part is configured to provide first light having a first spectral light distribution with a light intensity essentially within said first wavelength range, and
  a second light generating part consisting of a second subset of the plurality of light emitting diodes, wherein downstream of the optical path of each LED of the second subset of the plurality of light emitting diodes a light conversion element is configured, the light conversion element configured to convert at least part of the LED light generated by the second subset of the plurality of light emitting diodes into converted light having a wavelength that is essentially within the second wavelength range, wherein the second light generating part is configured to provide second light, consistently essentially of said converted light,
 wherein the light conversion element is noncontiguous with any light emitting surface of each LED of the second subset, and
 wherein the spectral light distributions, in the first wavelength range and the second wavelength range of the first light and the second light are different,
 the lighting device further comprising a plurality of light chambers, each of said chambers comprising walls and a top surface, thereby forming a cavity, and each of said light chambers containing less than two of the light emitting diodes,
 wherein the light emitting diodes of the second subset of the plurality of light emitting diodes are each arranged in one of a subset of the light chambers, wherein each light chamber of that subset comprises the light conversion element being positioned on the top surface of the light chamber, and
 wherein the lighting device further comprising a control unit whereby the first subset of the plurality of light emitting diodes and the second subset of the plurality of light emitting diodes are independently controllable to thereby enable electronically controlling the intensity of the first light and the second light.

14. A method of illuminating crop comprising:
 positioning a lighting device at a distance 10-50 cm from the crop, and
 illuminating at least part of the crop with horticulture light from the lighting device;
 wherein the lighting device is configured to provide horticulture light having a spectral light distribution with a light intensity at a first wavelength range of 400-475 nm and at a second wavelength range of 625-800 nm, the lighting device comprising a plurality of light emitting diodes (LEDs) configured to generate LED light having a wavelength essentially within said range of 400-475 nm, wherein the plurality of light emitting diodes are configured in an array, wherein the lighting device comprises at least two light generating parts, wherein
 a first light generating part consisting of a first subset of the plurality of light emitting diodes, wherein the first light generating part is configured to provide first light having a first spectral light distribution with at least light intensity essentially within said first wavelength range, and
 a second light generating part consisting of a second subset of the plurality of light emitting diodes, wherein downstream of the optical path of each LED of the second subset of the plurality of light emitting diodes a light conversion element is configured, the light conversion element configured to convert at least part of the LED light generated by the second subset of the plurality of light emitting diodes into converted light essentially within the second wavelength range, wherein the second light generating part is configured to provide second light, comprising at least part of said converted light,
 wherein the light conversion element is noncontiguous with any light emitting surface of each LED of the second subset,
 wherein the spectral light distributions, in the first wavelength range and the second wavelength range, of the first light and the second light are different, and
 wherein the lighting device further comprising a control unit whereby the first subset of the plurality of light emitting diodes and the second subset of the plurality of light emitting diodes are independently controllable to thereby enable electronically controlling the intensity of the first light and the second light.

15. The method according to claim 14, comprising varying the spectral light distribution of the horticulture light as a function of one or more of
 (a) the addressed part of the crop,
 (b) the time of the day, (c) the light intensity and light distribution of other light than the horticulture light,
(d) the type of crop,
(e) the growth stage of the crop,
(f) the stage of a fruit,
(g) the time to harvest,
(h) the time from harvest, and
(i) position in horticulture arrangement.

\* \* \* \* \*